United States Patent
Chang

(10) Patent No.: US 7,260,642 B2
(45) Date of Patent: Aug. 21, 2007

(54) METHOD AND SYSTEM FOR REAL-TIME MONITORING IMAGE TRANSMISSION

(75) Inventor: Shao-Ning Chang, Taipei (TW)

(73) Assignee: ICP Electronics Inc., Taipei Hsien (TW)

( * ) Notice: Subject to any disclaimer, the term of this patent is extended or adjusted under 35 U.S.C. 154(b) by 821 days.

(21) Appl. No.: 10/444,570

(22) Filed: May 22, 2003

(65) Prior Publication Data

US 2004/0205122 A1 Oct. 14, 2004

(30) Foreign Application Priority Data

Feb. 25, 2003 (TW) .............................. 92103922 A

(51) Int. Cl.
G06F 15/173 (2006.01)
G06F 15/16 (2006.01)
(52) U.S. Cl. ..................... 709/236; 709/246; 709/247
(58) Field of Classification Search ................ 709/236, 709/246, 223–6, 230, 247
See application file for complete search history.

(56) References Cited

U.S. PATENT DOCUMENTS

| | | | | |
|---|---|---|---|---|
| 5,673,340 A | * | 9/1997 | Kanda | 382/250 |
| 5,754,700 A | * | 5/1998 | Kuzma | 382/236 |
| 6,064,436 A | * | 5/2000 | Okada | 375/240.16 |
| 6,456,664 B1 | * | 9/2002 | Matsumura et al. | 375/240.27 |
| 6,795,584 B2 | * | 9/2004 | Karczewicz et al. | 382/239 |
| 6,868,122 B2 | * | 3/2005 | O'Neill | 375/240.12 |
| 6,996,283 B2 | * | 2/2006 | Thyagarajan | 382/239 |
| 7,031,385 B1 | * | 4/2006 | Inoue et al. | 375/240.08 |
| 7,058,130 B2 | * | 6/2006 | Liu et al. | 375/240.16 |
| 2002/0039450 A1 | * | 4/2002 | Kimoto | 382/239 |
| 2003/0081845 A1 | * | 5/2003 | Mukherjee et al. | 382/239 |
| 2003/0206658 A1 | * | 11/2003 | Mauro et al. | 382/239 |
| 2004/0096112 A1 | * | 5/2004 | Kuo | 382/239 |
| 2004/0247192 A1 | * | 12/2004 | Kajiki et al. | 382/239 |
| 2005/0100233 A1 | * | 5/2005 | Kajiki et al. | 382/239 |

* cited by examiner

Primary Examiner—Paul H. Kang
(74) Attorney, Agent, or Firm—Ladas & Parry LLP

(57) ABSTRACT

A method for real-time monitoring image transmission. First, the frame is divided into a plurality of sub-blocks and numbered in order. Then, a sub-block with variation is designated as a start sub-block, and sub-blocks adjacent to the start sub-block are searched and the sub-blocks with variation are grouped to generate at least one variant sub-block set, in which the variant sub-blocks in the set are connected to each other and form a rectangle. Thereafter, the compressed variant sub-block set and the corresponding numbers of each variant sub-block in the set are transmitted to the server. Afterward, the server replaces corresponding sub-blocks having the same numbers in an original frame with the received variant sub-blocks.

15 Claims, 8 Drawing Sheets

METHOD AND SYSTEM FOR REAL-TIME MONITORING IMAGE TRANSMISSION

BACKGROUND OF THE INVENTION

1. Field of the Invention

The present invention relates to a method and system for real-time monitoring image transmission, and particularly to a method and system for real-time monitoring image transmission that reduces bandwidth used in transmission according to properties of image compression, thereby optimizing network traffic and speeding transmission.

2. Description of the Related Art

Using network techniques to monitor a remote computer or a peripheral device, such as a Keyboard, Video or Mouse (KVM) has become a common monitoring practice. FIG. 1 depicts a conventional remote image monitoring system, which manages clients via a KVM bus of a host 11 (server). Users can use server switches to monitor the image of the computer systems (clients 13 and 14) in the LAN (Local Area Network) and WAN (Wide Area Network) through a network interface 12.

The conventional system employs full screen transmission to transmit the monitored image, i.e., the client (13 or 14) transmits a full image (frame) with or without compression to the server 11 in a fixed frequency (frame/sec). Since the image data is always large, the transmission will need large network bandwidth, thereby resulting in slow network traffic. Thus, the remote object is hard to be real-time monitored.

In addition, another conventional method is performed by dividing a frame into several sub-frames (sub-blocks), and using a detection module to detect and calculate the variations (variant blocks or dynamics blocks) between any two successive frames, and then only transmitting the variation to the server.

For example, a frame of 1027*768 pixels can be divided into 256 sub-blocks, in which each sub-block is 64*48 pixels. FIG. 2A shows two connected variant blocks 21 and 22. In network transmission, if the variant blocks 21 and 22 are encoded individually, the variant blocks 21 and 22 processed under JPEG compression are 785 and 745 bytes respectively, and the amount of transmission is 785+745=1530 bytes. However, if the variant blocks 21 and 22 are combined and encoded, the combined block processed under JPEG compression contains 964 bytes. According to above, the JPEG overhead for each sub-block of 64*48 pixels is 1530−964=500 bytes. Therefore, the ratio of overhead to amount of transmission is 500/1530=33% if two variant blocks 21 and 22 are transmitted at one time, however, the ratio of overhead to amount of transmission is 500/(1530/2)=66% if two variant blocks 21 and 22 are transmitted individually.

FIG. 2B shows four connected variant blocks 21, 22, 23 and 24. Similarly, a frame of 1027*768 pixels is divided into 256 sub-blocks, and each sub-block contains 64*48 pixels. If the variant blocks 21, 22, 23 and 24 are individually encoded in the JPEG format, the variant blocks 21, 22, 23 and 24 will contain 785, 745, 1272, 840 bytes respectively, and the amount of transmission is 785+745+1272+840=3642 bytes. However, if the variant blocks 21, 22, 23 and 24 are combined and then encoded in the JPEG format, the combined block will contain 1966 bytes. In this case, the JPEG overhead can be reduced by 50% if the variant blocks 21, 22, 23 and 24 are combined and then encoded in the JPEG format. Therefore, the network bandwidth needed for transmission of several variant blocks transmitted simultaneously is less than that needed for these variant blocks to be transmitted individually.

Conventional methods do not fully utilize the above properties, and thus result in too much overhead in transmission. Since relationships or interactions may exist between variant blocks such that these variant blocks are connected, and able to be transmitted simultaneously, to reduce network bandwidth.

SUMMARY OF THE INVENTION

It is therefore an object of the present invention to provide a method and system for real-time monitoring image transmission, that optimize network traffic to reduce bandwidth used in transmission, according to properties of image compression, thereby speeding transmission and updating the remote monitored images real time.

To achieve the above object, the present invention further provides a method for real-time monitoring image transmission. The method can be used in a network system connected with a server and a client. First, a frame received by the client is divided into a plurality of sub-blocks and numbered in order. Then, a sub-block with variation is designated as a start sub-block, and sub-blocks adjacent to the start sub-block are searched and those with variation are grouped to generate at least one variant sub-block set, then the variant sub-blocks in the set are connected to each other to form a rectangle.

The variant sub-block set, after being compressed, and the corresponding number of each variant sub-block in the set are transmitted to the server. Afterward, the server replaces the contents of corresponding sub-blocks having the same numbers in an original frame with those of the received variant sub-blocks.

The method for generating the variant sub-block set adds the start sub-block to the variant sub-block set. Then, it is determined whether all rightward sub-blocks connected with the variant sub-block set are variant sub-blocks. If so, the rightward sub-blocks are added to the variant sub-block set. Thereafter, it is determined whether all below sub-blocks connected with the updated variant sub-block set are variant sub-blocks. If so, the below sub-blocks are added to the variant sub-block set. If the rightward and below sub-blocks connected with the variant sub-block set are not all variant sub-blocks, the variant sub-block set is generated. When all the variant sub-blocks in the frame are examined, the method is completed.

According to another aspect, the method for generating the variant sub-block set adds the start sub-block to the variant sub-block set, and defines a set threshold, representing the ratio of variant sub-blocks to all sub-blocks in the variant sub-block set. Then, it is determined whether a temporary set including the variant sub-block set and the rightward sub-blocks connected with the variant sub-block set conforms to the set threshold. If so, the rightward sub-blocks are added to the variant sub-block set. Thereafter, it is determined whether a temporary set including the updated variant sub-block set and the below sub-blocks connected with the variant sub-block set conforms to the set threshold. If so, the below sub-blocks are added to the variant sub-block set. If the temporary set including the variant sub-block set and the rightward sub-blocks and the temporary set including the variant sub-block set and below sub-blocks connected with the variant sub-block set do not conform to the set threshold, the variant sub-block set is generated. When all the variant sub-blocks in the frame are examined, the method is completed.

BRIEF DESCRIPTION OF THE DRAWINGS

The aforementioned objects, features and advantages of the invention will become apparent by referring to the following detailed description of the preferred embodiment with reference to the accompanying drawings, wherein.

DETAILED DESCRIPTION OF THE INVENTION

Figure 1:
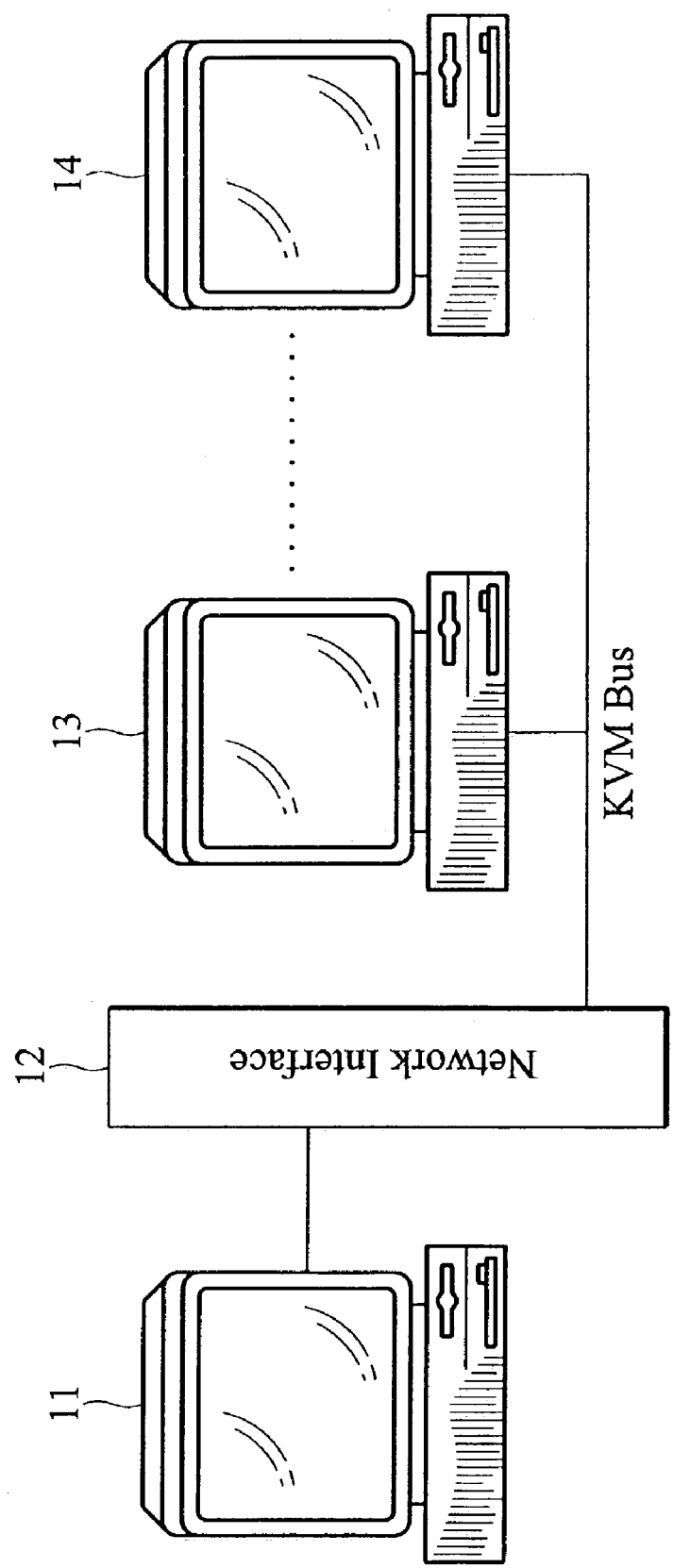
FIG. 1 shows a conventional remote image monitoring system.
Figure 2A:
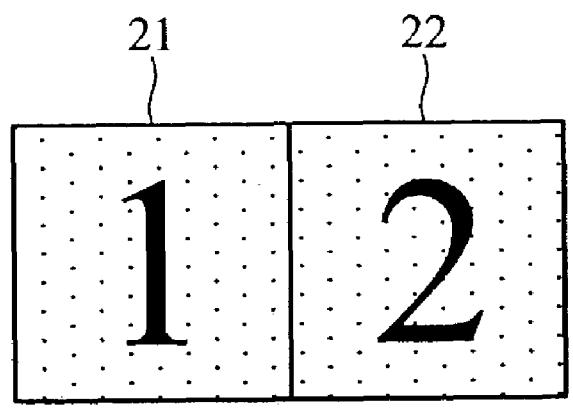
FIG. 2A shows two connected variant blocks.
Figure 2B:
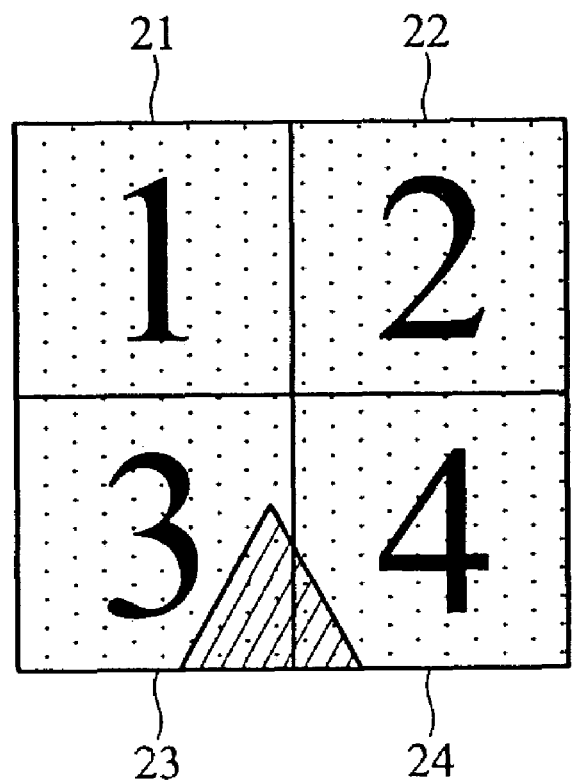
FIG. 2B shows four connected variant blocks.
Figure 3:
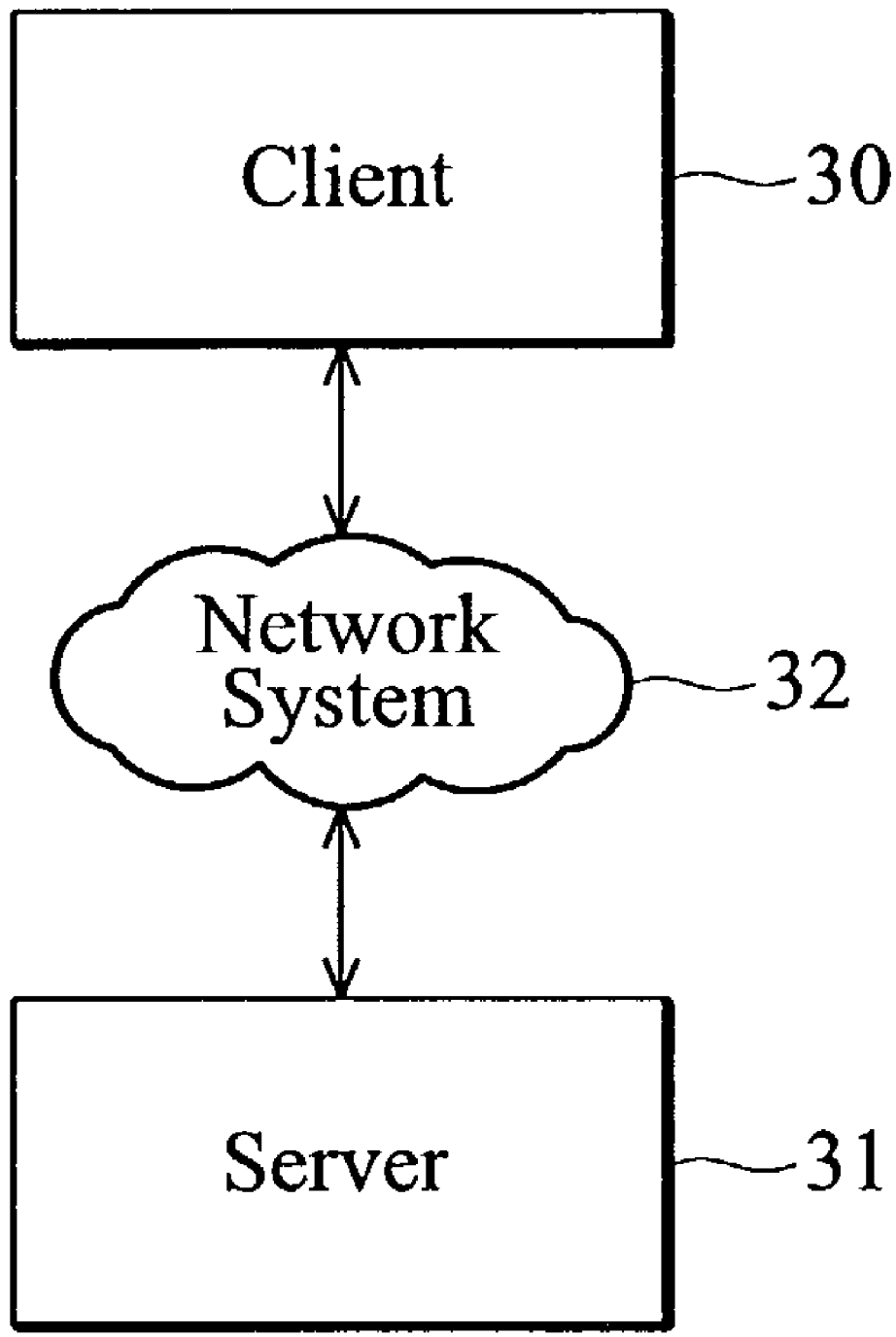
FIG. 3 is a schematic diagram illustrating the architecture of the system for real-time monitoring image transmission according to the embodiment of the present invention.

FIG. 3 illustrates the architecture of the system for real-time monitoring image transmission according to the preferred embodiment of the present invention. The system includes a client 30, a server 31 and a network system 32. The network system 32 connects the client 30 and the server 31, and the network system 32 may be Internet, LAN (Local Area Network) and/or WAN (Wide Area Network).

The server 31 may use monitor mechanism, such as KVM bus to monitor the client 30 via the network system 32, and the client 30 transmits monitored images to the server 31 to be displayed real time. The operation between the client 30 and the server 31 is discussed referring to FIG. 4 as follows.

Figure 4:
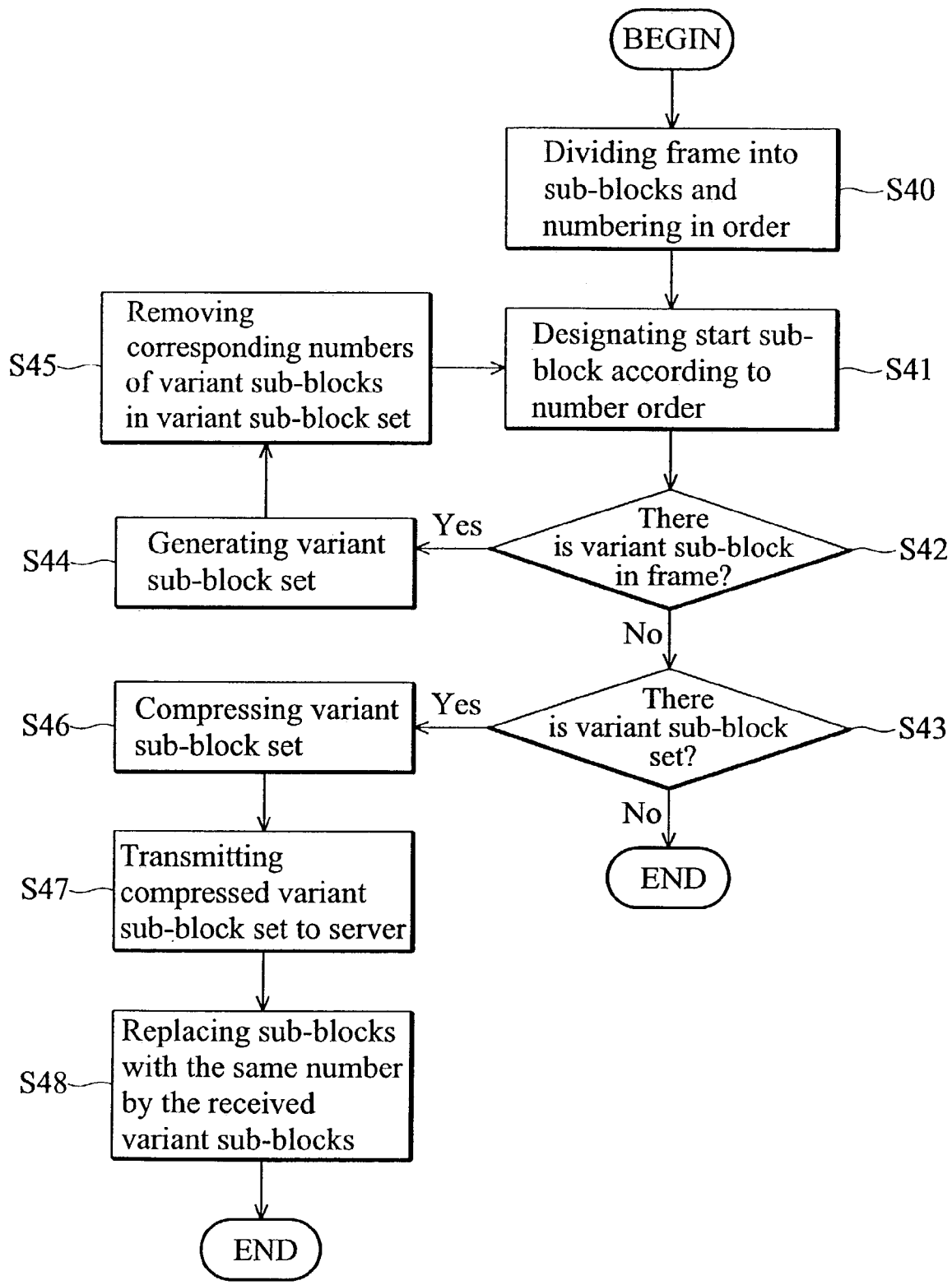
FIG. 4 is a flowchart showing the process of the method for real-time monitoring image transmission according to the embodiment of the present invention.

FIG. 4 shows the process of the method for real-time monitoring image transmission according to the preferred embodiment of the present invention. First, in step S40, the client 30 divides each received video frame into a plurality of sub-blocks and numbers them in order. Then, in step S41, according to the order of the corresponding numbers, the client 30 designates a sub-block having variation in the frame as a start sub-block, that is, the first variant sub-block in the frame is selected as a start point for searching the variant sub-block set. It should be noted that the video frames are gathered from a VGA adapter of the client 30, and the then client 30 determines whether the sub-block is a variant sub-block by comparing the contents of two sub-blocks having the same number in two successive frames respectively.

If there is not variant sub-block in the frame ("No" in step S42), the flow goes to step S43, otherwise ("Yes" in step S42), goes to step S44, the client searches a variant sub-block set, including the start sub-block. In the embodiment, a frame may include several variant sub-block sets, and each variant sub-block set may include several variant sub-blocks. It is noted that the variant sub-blocks may be grouped into a variant sub-block set if the variant sub-blocks are connected or the variant sub-blocks form a rectangle. In addition, the method for generating the variant sub-block set can be implemented according to two aspects, and is discussed hereafter by referring to FIG. 5 and FIG. 7 respectively.

Figure 5:
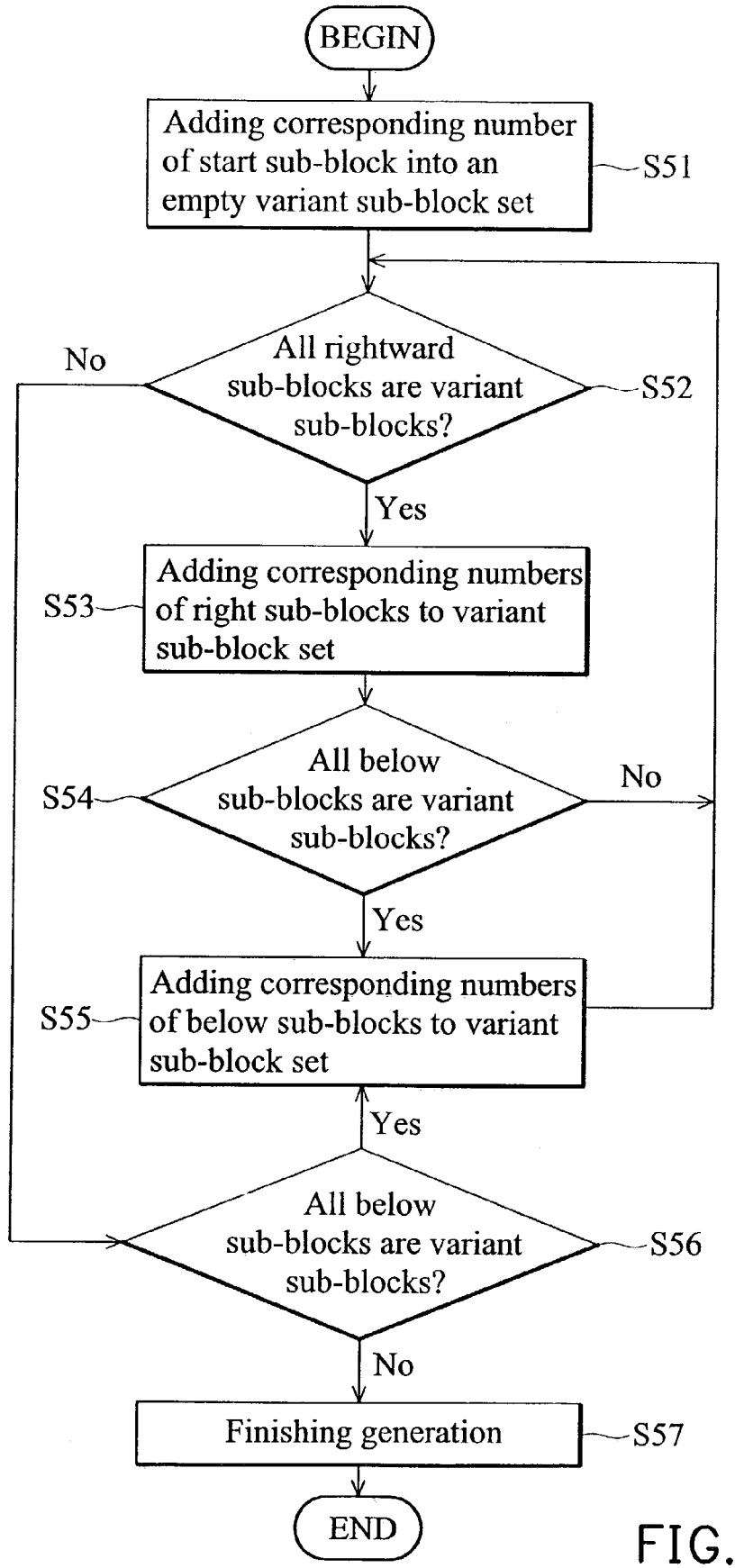
FIG. 5 is a flowchart showing the process of the method for generating variant sub-block set according to a first aspect of the present invention.

FIG. 5 shows the process of the method for generating variant sub-block set according to the first aspect of the present invention. First, in step S51, the client 30 first adds the number of the start sub-block to an empty variant sub-block set. Then, in step S52, it is determined whether all rightward sub-blocks connected with the variant sub-block set are variant sub-blocks. It should be noted that the rightward sub-blocks mean the next sub-blocks of the variant sub-block set in row. If so ("Yes" in step S52), in step S53, the corresponding numbers of the rightward sub-blocks are added to the variant sub-block set. Otherwise ("No" in step S52), the flow goes to step S56.

Then, in step S54, it is determined whether all below sub-blocks connected with the updated variant sub-block set are variant sub-blocks. It also should be noted that the below sub-blocks mean the next sub-blocks of the variant sub-block set in column. If so ("Yes" in step S54), in step S55, the corresponding numbers of the below sub-blocks are added to the variant sub-block set, and the flow returns to step S52 for further searching. Otherwise ("No" in step S54), the flow returns directly to step S52.

If the rightward sub-blocks connected with the variant sub-block set are not all variant sub-blocks ("No" in step S52), in step S56, the client 30 checks whether all below sub-blocks connected with the updated variant sub-block set are variant sub-blocks. If so ("Yes" in step S56), in step S55, the corresponding numbers of the below sub-blocks are added to the variant sub-block set, and the flow returns to step S52. Otherwise ("No" in step S56), if the rightward and below sub-blocks connected with the variant sub-block set are not all variant sub-blocks, in step S57, the search process of the variant sub-block set is finished.

It should be noted that once any of the rightward sub-blocks connected with the variant sub-block set is found to not be a variant sub-block ("No" in step S52), the rightward sub-block search is omitted, and only the below sub-block search is performed. Similarly, once any of the below sub-blocks connected with the variant sub-block set is found not to be a variant sub-block ("No" in step S54), the below sub-block search may be omitted, and only the rightward sub-block search is performed.

After the determinations of steps S56 and S57, the search process of one variant sub-block set is finished, and the flow returns to step S45 in FIG. 4. In step S45, the corresponding numbers of the variant sub-blocks in the variant sub-block set are recorded and removed from the complete sub-block set. The client 30 may designate another start sub-block from the remnant sub-blocks to generate another variant sub-block set until no variant sub-block remains in the remnant sub-blocks.

Figure 6:
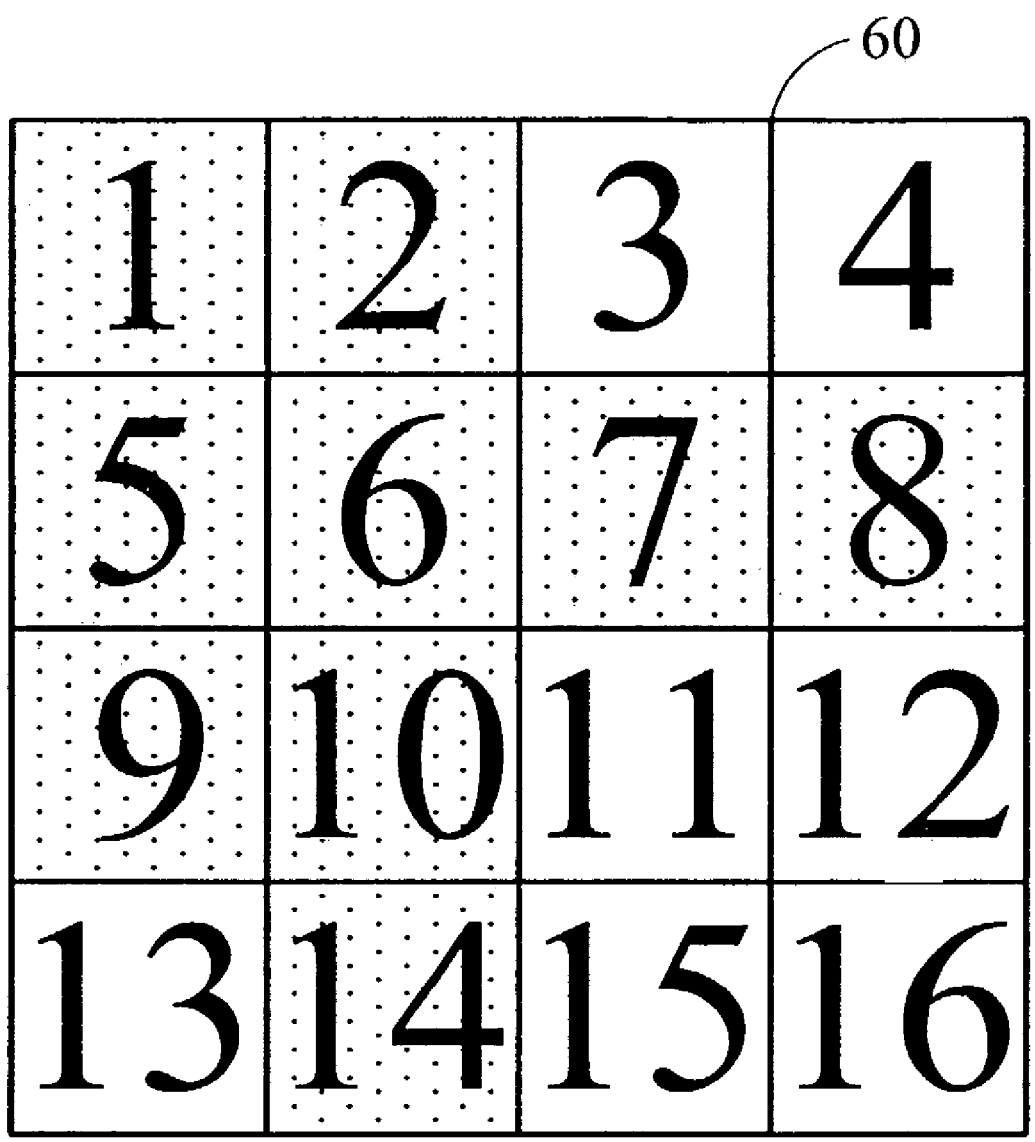
FIG. 6 shows a frame divided into 16 sub-frames.

FIG. 6 shows a frame 60. The frame 60 is first divided into 16 sub-blocks having respectively corresponding numbers, wherein the sub-blocks with dots are variant sub-blocks, and the complete sub-block set is {1,2,3,4,5,6,7,8,9,10,11,12,13,14,15,16}. Then, sub-block 1 is selected as the start sub-block since sub-block 1 is the first variant sub-block in the frame 60.

According to the method depicted in FIG. 5, the number of sub-block 1 is added to the variant sub-block set {1}. Since the rightward sub-block (sub-block 2) of the variant sub-block set is a variant, the number of sub-block 2 is added to the set so as to form the variant sub-block set {1,2}. Then, since both the rightward sub-blocks (sub-blocks 5 and 6) of the variant sub-block set are variants, the numbers of sub-blocks 5 and 6 are added so as to form the variant sub-block set {1,2,5,6}.

Afterward, since sub-block 3 is not variant, the search of the rightward sub-block finishes. Then, since both the below sub-blocks (sub-blocks 9 and 10) of the variant sub-block set are variant, the numbers of sub-blocks 9 and 10 are added to the set so as to form the variant sub-block set {1,2,5,6,9,10}. Thereafter, since sub-block 13 is not a variant, the search of the below sub-block finishes, and the first variant sub-block set {1,2,5,6,9,10} is generated.

Then, the first variant sub-block {1,2,5,6,9,10} is removed from the complete sub-block set, thereby forming a remnant sub-block set {3,4,7,8,11,12,13,14,15,16}. Similarly, the second variant sub-block set {7,8} and third variant sub-block set {14} can be generated from the remnant sub-blocks.

If each sub-block in transmission contains 100 bytes and the overhead ratio of each sub-block is 66%, the overhead of each sub-block is 66 bytes. In conventional methods, every sub-block is transmitted to the server individually, the amount of transmission is ((66+34)*9)=900 bytes. In the preferred embodiment, the transmission of the first variant sub-block set {1,2,5,6,9,10} is 66+(100−66)*6=270 bytes, the transmission of the second variant sub-block set {7,8} is 66+(100−66)*2=134 bytes, and the transmission of the third variant sub-block set {14} is 66+(100−66)*1=100 bytes. Thus, the total amount of transmission is 270+134+100=504 bytes. The ratio of the present invention according to the first aspect to the conventional methods is 504/900=56%. It is obvious that the present invention reduces network traffic by 44% in transmission. If the variant sub-block set contains more variant sub-blocks, the improvement rate will raise significantly.

Figure 7:
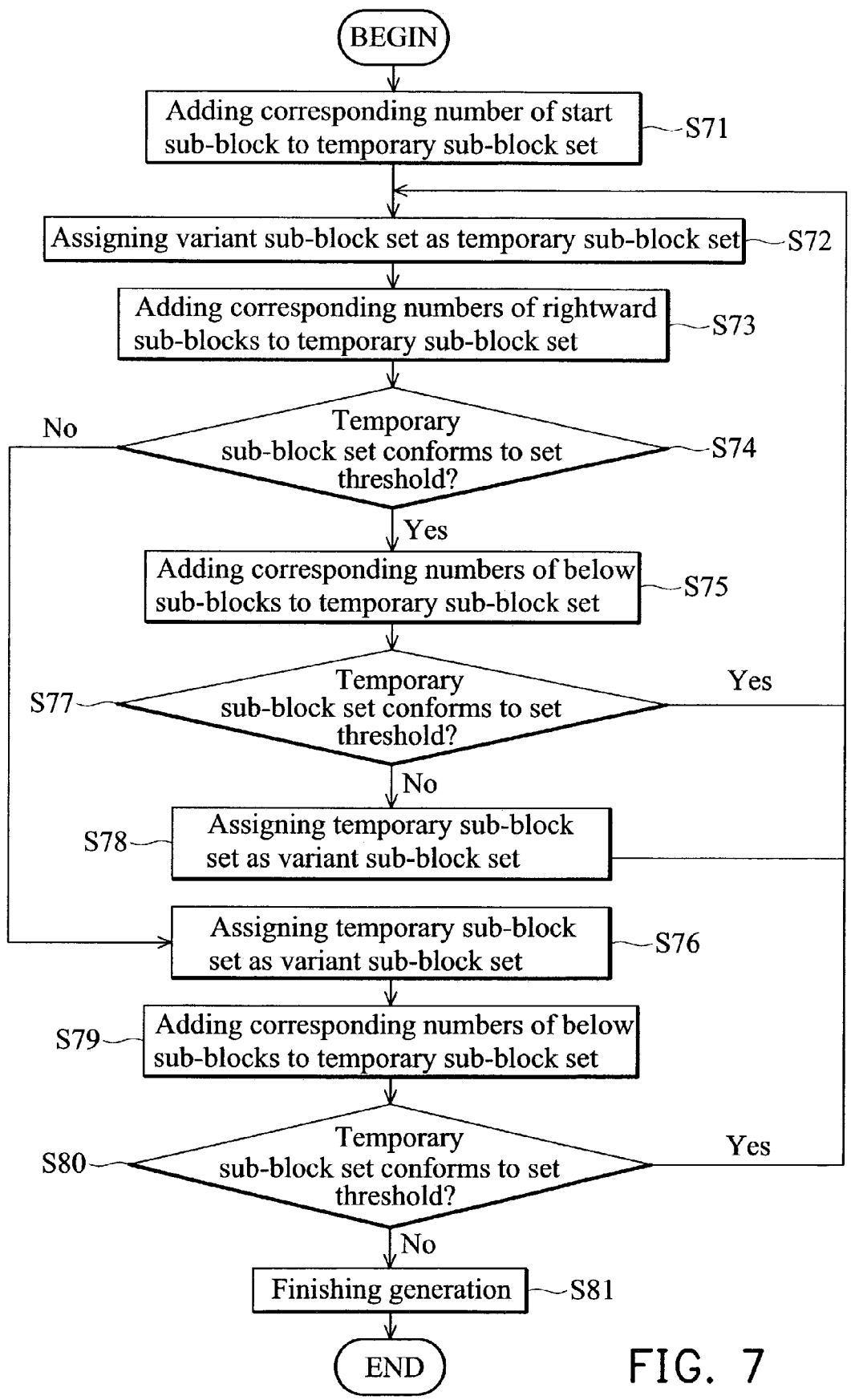
FIG. 7 is a flowchart showing the process of the method for generating variant sub-block set according to the second aspect of the present invention.

FIG. 7 shows the process of the method for generating the variant sub-block set according to the second aspect of the present invention. Similarly, steps S40, S41, S42 and S44 are first performed, then, in step S71, the client 30 adds the number of the start sub-block to an empty temporary sub-block set, which is the start point to search the variant sub-block set. Then, in step S72, a variant sub-block set is assigned as the temporary sub-block set. It is noted that in the beginning, the variant sub-block set equals to temporary sub-block set and start sub-block respectively.

Then, in step S73, the client 30 adds the corresponding numbers of rightward sub-blocks connected with the temporary sub-block set to the temporary sub-block set, and calculates a temporary set threshold as equaling (the number of variant sub-blocks in the temporary sub-block set)/(the number of sub-blocks in the temporary sub-block set). In the first aspect, the client 30 first determines whether the rightward (or below) sub-blocks are variant sub-blocks and adds them to variant sub-block set if they are. However, in the second aspect, the client 30 first adds the rightward sub-blocks to the temporary sub-block set, and checks whether the corresponding temporary set threshold conforms to a preset set threshold, and adds the rightward sub-blocks into the variant sub-block set if the temporary set threshold conforms to the set threshold.

Then, in step S74, it is determined whether the temporary sub-block set including the rightward sub-blocks conforms to the set threshold, which can be set between 0 and 1 by users, and the temporary set threshold of the temporary sub-block set should be greater than or equal to the set threshold. If so, in step S75, the numbers of below sub-blocks connected with the temporary sub-block set are added to the temporary sub-block set. Otherwise, in step S76, the temporary sub-block set is assigned as the variant sub-block set, that is, the numbers of the rightward sub-blocks are removed from the temporary sub-block set, and the conclusion is that the variant sub-block set equals to temporary sub-block set and start sub-block respectively.

In step S77, it is determined whether the temporary sub-block set including the below sub-blocks conforms to the set threshold. If so, the flow returns to step S72, in which the variant sub-block set is updated by assigning the contents of the temporary sub-block set to it. Otherwise ("No" in step S77), in step S78, the temporary sub-block set is assigned as the variant sub-block set, and the flow returns to step S72.

After the determination in step S74, if the temporary sub-block set including the rightward sub-blocks does not conform to the set threshold ("No" in step S74), the flow goes to step S76, and the temporary sub-block set is assigned as the variant sub-block set. In step S79, the numbers of below sub-blocks connected with the temporary sub-block set are added to the temporary sub-block set. Then, in step S80, it is determined whether the temporary sub-block set including the below sub-blocks conforms to the set threshold. If so, the flow returns to step S72, the variant sub-block set is updated by assigning the contents of the temporary sub-block set to it. Otherwise ("No" in step S80), in step S81, the search process of the variant sub-block set is finished, and the flow returns to step S45 in FIG. 4.

As those disclosed regarding the first aspect, the corresponding numbers of the variant sub-blocks in the variant sub-block set are recorded and then removed from the complete sub-block set. The client 30 may designate another start sub-block from the remnant sub-blocks to generate another variant sub-block set until there is not any variant sub-block in the remnant sub-blocks.

Figure 8:
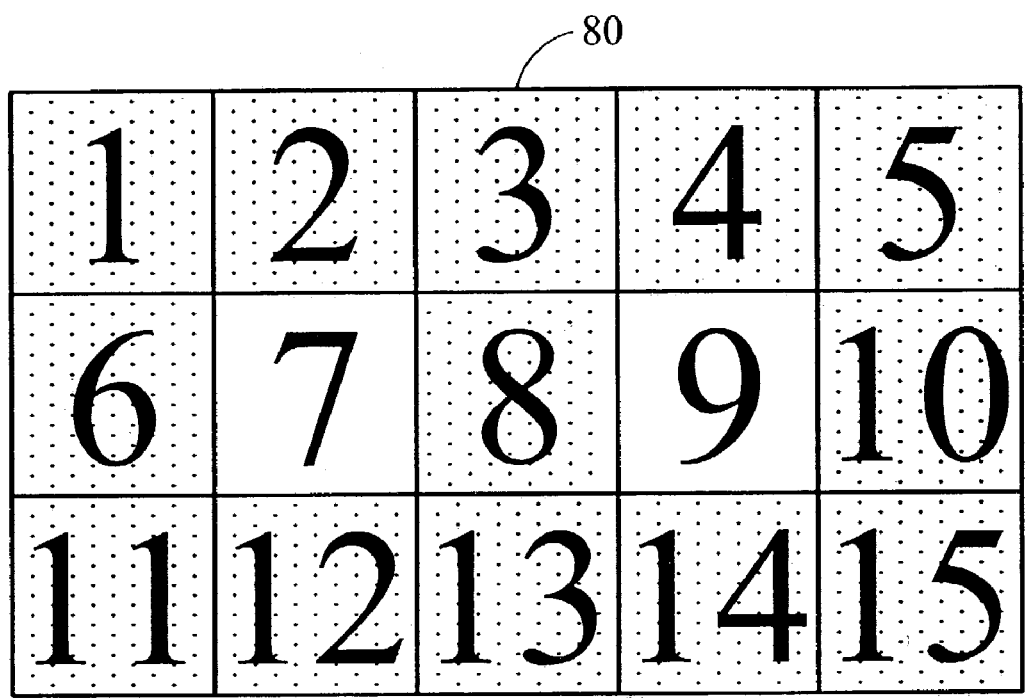
FIG. 8 shows another frame divided into 15 sub-frames.

FIG. 8 shows another frame 80 containing 15 sub-blocks. The frame 80 is first divided into 15 sub-blocks with corresponding numbers. The sub-blocks with dots are variant sub-blocks in the frame 80, the complete sub-block set is {1,2,3,4,5,6,7,8,9,10,11,12,13,14,15}, and the set threshold is set as ¾.

The sub-block 1 is selected as the start sub-block since the sub-block 1 is the first variant sub-block in the frame 80. According to the method illustrated in FIG. 7, the number of sub-block 1 is added to the temporary sub-block set {1}, and the variant sub-block set is assigned as the temporary sub-block set {1}. Then, the number of rightward sub-block (sub-block 2) is added to the temporary sub-block set {1, 2}. Since the temporary set threshold is "2/2=1" which is greater than the set threshold "¾", the numbers of below sub-blocks (sub-blocks 6 and 7) are added to the temporary sub-block set {1,2,6,7}. Since the temporary set threshold corresponding to the temporary sub-block set {1,2,6,7} is "¾" which equals to the set threshold "¾", the variant sub-block set is assigned as the temporary sub-block set {1,2,6,7}.

If the temporary sub-block set including the original variant sub-block set, the rightward sub-blocks and below sub-blocks connected with the variant sub-block set do not conform to the set threshold, the variant sub-block set will be generated. In this case, the generated variant sub-block set is {1,2,3,4,5,6,7,8,9,10,11,12,13,14,15}. It should be noted that the set threshold can be set according to image type, transmission status, environment, and others. In addition, if the set threshold is set as 1, the second aspect and the first aspect have the same determination operations.

The purpose of the second aspect is to consider a part of non-variant sub-blocks into the variant sub-block set, and maximize the variant sub-block set, so as to improve transmission.

Referring to FIG. 4 again, if all the variant sub-blocks in the frame are examined ("No" in step S42), and then at least one variant sub-block set is generated ("Yes" in step S43). In step S46, the variant sub-block set including the sub-blocks is compressed, such as the JPEG compression. Then, in step S47, the variant sub-block set is compressed and the corresponding numbers of each variant sub-block in the variant sub-block set are transmitted to the server 31. After receiving the information, in step S48, the server 31 replaces corresponding sub-blocks having the same numbers in an original frame with the received variant sub-blocks.

As a result, using the method and system for real-time monitoring image transmission according to the present invention, network traffic can be optimized to reduce bandwidth used in transmission according to properties of image compression, thereby speeding transmission and real time updating the remote monitored image.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for real-time monitoring image transmission for used in a network system connecting a server and a client, comprising the steps of:
    gathering a first frame and a second frame which is subsequent to the first frame from the client, and respectively dividing the first frame and the second frame into a plurality of sub-blocks, in which each sub-block has a corresponding number;
    detecting a variant sub-block from the sub-blocks in the second frame by comparing contents of the sub-blocks having the same number in the first frame and the second frame, and assigning the variant sub-block as a start sub-block;
    performing at least one determination rule on sub-blocks in a specified region of the start sub-block in the second frame, so as to generate a variant sub-block set including the start sub-block and sub-blocks that conform to the determination rule;
    compressing the variant sub-block set; and
    transmitting the compressed variant sub-block set to the server.

2. The method for real-time monitoring image transmission as claimed in claim 1, further comprising replacement of sub-blocks having the same numbers in an original frame with sub-blocks in the received variant sub-block set by the server.

3. The method for real-time monitoring image transmission as claimed in claim 1, further comprising the steps of:
    assigning a detection order as the number order of the sub-blocks; and
    detecting the variant sub-block from the sub-blocks according to the detection order, and assigning the first detected variant subblock as the start sub-block.

4. The method for real-time monitoring image transmission as claimed in claim 1, wherein the sub-blocks in the variant sub-block set form a rectangle.

5. The method for real-time monitoring image transmission as claimed in claim 1, wherein the procedure for generating the variant sub-block set comprises the steps of:
    adding the start subblock to the variant sub-block set;
    determining whether all rightward sub-blocks connected with the variant sub-block set are variant sub-blocks; and
    adding the rightward sub-blocks to the variant sub-block set if all the rightward sub-blocks are variant sub-blocks.

6. The method for real-time monitoring image transmission as claimed in claim 5, wherein the procedure for generating the variant sub-block set further comprises the steps of:
    determining whether all below sub-blocks connected with the variant subblock set are variant sub-blocks; and
    adding the below sub-blocks to the variant sub-block set if all the below sub-blocks are variant sub-blocks.

7. The method for real-time monitoring image transmission as claimed in claim 6, wherein the procedure for generating the variant sub-block set further comprises the steps of finishing the generation of the variant sub-block set if not all the rightward sub-blocks are variant and not all the below sub-blocks are variant.

8. The method for real-time monitoring image transmission as claimed in claim 1, wherein the generation procedure of the variant sub-block set comprises the steps of:
    adding the start subblock to a temporary sub-block set;
    assigning a variant sub-block set as the temporary sub-block set;
    defining a temporary set threshold, representing the ratio of variant sub-blocks to all sub-blocks in the temporary sub-block set;
    adding rightward sub-blocks connected with the temporary subblock set to the temporary sub-block set;
    checking whether the temporary set threshold of the temporary sub-block set including the rightward sub-blocks conforms to a set threshold;
    adding below sub-blocks connected with the temporary sub-block set to the temporary sub-block set if the temporary set threshold of the temporary sub-block set including the rightward sub-blocks conforms to the set threshold;
    checking whether the temporary set threshold of the temporary sub-block set including the below sub-blocks conforms to the set threshold; and
    assigning the variant sub-block set as the temporary sub-block set if the temporary set threshold including the below sub-blocks conforms to the set threshold.

9. The method for real-time monitoring image transmission as claimed in claim 8, wherein the procedure for generating the variant sub-block set further comprises the step of assigning the temporary sub-block set as the variant sub-block set if the temporary set threshold of the temporary sub-block set including the rightward sub-blocks does not conform to the set threshold.

10. The method for real-time monitoring image transmission as claimed in claim 8, wherein the procedure for generating the variant sub-block set further comprises the step of assigning the temporary sub-block set as the variant sub-block set if the temporary set threshold of the temporary sub-block set including the below sub-blocks does not conform to the set threshold.

11. The method for real-time monitoring image transmission as claimed in claim 8, wherein the procedure for generating the variant sub-block set further comprises the steps of finishing the generation of the variant sub-block set if the temporary set threshold of the temporary sub-block set including the rightward sub-blocks does not conform to the set threshold and the temporary set threshold of the temporary sub-block set including the below sub-blocks does not conform to the set threshold.

12. A system for real-time monitoring image transmission, comprising:

a server;

a network system; and a client to detect a variant sub-block from a plurality of sub-blocks in a first frame by comparing the contents of sub-blocks having corresponding numbers in the first frame with the contents of sub-blocks having the same numbers in a second frame antecedent to the first frame, assign the variant sub-block as a start sub-block, generate a variant sub-block set including the start sub-block and sub-blocks adjacent to the start sub-block, compress the variant sub-block set, and transmit the compressed variant sub-block set to the server.

13. The system for real-time monitoring image transmission as claimed in claim 12, wherein the client further transmits corresponding numbers of the sub-blocks in the variant sub-block set to the server.

14. The system for real-time monitoring image transmission as claimed in claim 13, wherein the server further replaces sub-blocks having the same numbers in an original frame with sub-blocks in the received variant sub-block set.

15. The system for real-time monitoring image transmission as claimed in claim 12, wherein the sub-blocks in the variant sub-block set form a rectangle.

\* \* \* \* \*